(12) United States Patent
Yoon

(10) Patent No.: US 8,015,585 B2
(45) Date of Patent: Sep. 6, 2011

(54) METHOD FOR PREVENTING DISCONNECTION OF AUDIO/VIDEO STREAM IN HOME NETWORK

(75) Inventor: Jong-Hyun Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 2594 days.

(21) Appl. No.: 10/667,383

(22) Filed: Sep. 23, 2003

(65) Prior Publication Data

US 2004/0085998 A1 May 6, 2004

(30) Foreign Application Priority Data

Oct. 19, 2002 (KR) ........................ 10-2002-0064015

(51) Int. Cl.
*H04N 7/18* (2006.01)
*H04N 7/173* (2006.01)

(52) U.S. Cl. ................. 725/96; 725/78; 725/91; 725/93

(58) Field of Classification Search .................... 725/96, 725/74, 78, 82, 86, 87, 91, 93, 95, 105, 115, 725/116

See application file for complete search history.

(56) References Cited

U.S. PATENT DOCUMENTS

| | | | | |
|---|---|---|---|---|
| 5,671,377 A | * | 9/1997 | Bleidt et al. | 715/723 |
| 5,822,530 A | * | 10/1998 | Brown | 725/96 |
| 6,189,071 B1 | * | 2/2001 | Bachmat | 711/114 |
| 6,917,569 B1 | * | 7/2005 | Lam et al. | 369/30.15 |
| 7,086,077 B2 | * | 8/2006 | Giammaressi | 725/95 |
| 2003/0154480 A1 | * | 8/2003 | Goldthwaite et al. | 725/46 |
| 2006/0015574 A1 | * | 1/2006 | Seed et al. | 709/219 |

FOREIGN PATENT DOCUMENTS

KR 0152485 B1 10/1998

OTHER PUBLICATIONS

Microsoft Press Computer Dictionary, Third Edition, 1997, pp. 42.*

* cited by examiner

*Primary Examiner* — William Trost, IV
*Assistant Examiner* — John Schnurr
(74) *Attorney, Agent, or Firm* — Birch, Stewart, Kolasch & Birch, LLP

(57) ABSTRACT

A method for preventing disconnection of an audio/video stream in a home network includes: a step in which a renderer connected to a server requests A/V streams; a step in which the server judges whether A/V streams can be outputted in response to the request from the renderer; and a step in which the server provides the A/V streams to the renderer sequentially or simultaneously if the A/V stream can be outputted, or outputting a server unavailableness message to the renderer if the server judges that the A/V streams can not be outputted. Without a memory, even though plural renderers are simultaneously or sequentially connected to the server, an abnormal image is prevented from being outputted, so that a service user can be provided with an image without disconnection.

4 Claims, 2 Drawing Sheets

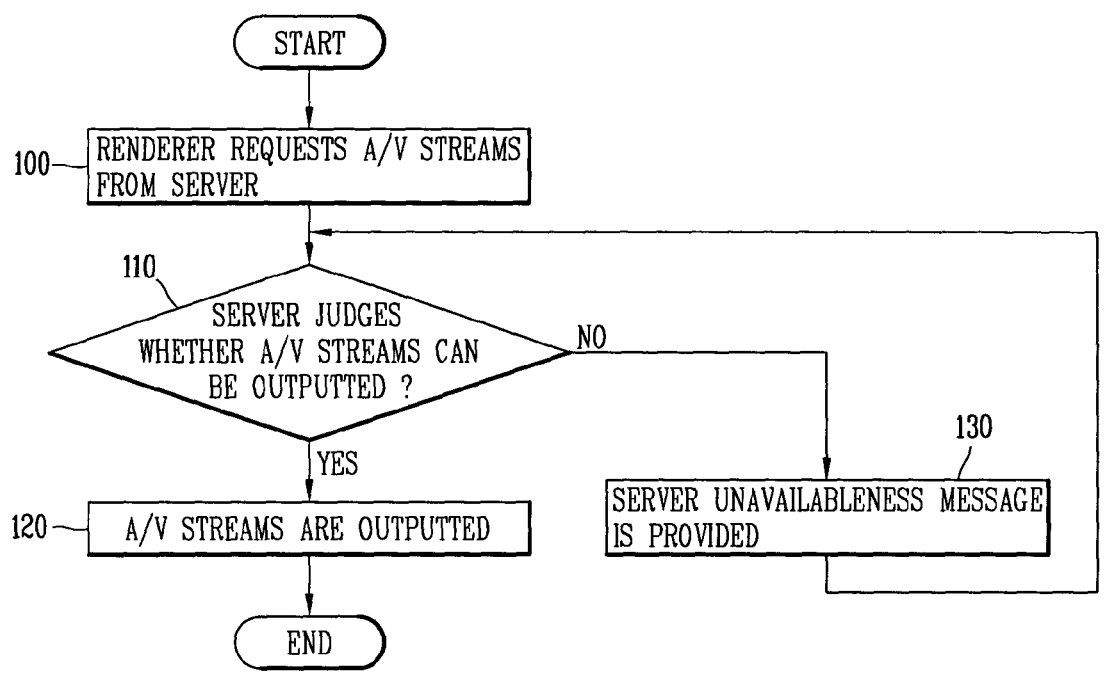

METHOD FOR PREVENTING DISCONNECTION OF AUDIO/VIDEO STREAM IN HOME NETWORK

This nonprovisional application claims priority under 35 U.S.C. §119(a) on Patent Application No. 2002-64015 filed in Korea on Oct. 19, 2002, which is herein incorporated by reference.

BACKGROUND OF THE INVENTION

1. Field of the Invention

The present invention relates to an audio/video stream transmission method and, more particularly, to a method for preventing disconnection of audio/video streams that is capable of continuously providing audio/video streams without disconnection to a screen when the audio/video streams are transferred to a plurality of renderers through a home network.

2. Description of the Background Art

In general, a home network is an environment in which home network devices at a home are connected as one network to share mutual information and use a broadband communication.

That is, the home network refers to a technique or a service that home network devices, such as a computer related equipment or an A/V device, a control or security device for home automation, an entertainment device such as a game machine, are all connected as one communication network (or home network) to share and control mutual information.

In the home network, one of the home network devices is set as a server while the other home network devices are set as renderers, thereby sharing and controlling mutual information.

FIG. 1 illustrates connection between the server and plural renderers by home network.

As shown in FIG. 1, the server 10 and first and second renderers are connected to the home network 20. The server 10 can be a medium reproducing unit for reproducing data, while the first and second renderers 11 and 12 can be a notebook computer or a DTV (Digital Television) for outputting audio/video streams received from the server 10 on a screen.

Accordingly, as the server 10 reads the A/V streams recorded in an optical recording medium reproducing unit and transmits it to the first and second renderers 11 and 12, a user can enjoy an audio/video content outputted from the first and second renderers 11 and 12.

The medium reproducing unit operating as a server includes a header for reading the A/V streams recorded in a storing medium such as a DVD (Digital Versatile Disc) or a hard disk.

FIG. 2 illustrates a hard disk medium reproducing unit as a server for reproducing the A/V streams.

As shown in FIG. 2, the hard disk medium reproducing unit 30 includes: a platter 31, a metal disk plate with a magnetic substance, for storing data, a spindle motor 32 for rotating the platter 31, a header 33 for reading and writing data to and from the platter 31, a header arm 34 for moving the header to a desired address on the platter 31, and a controller 35 including a circuit board for driving each part and controlling operations.

When a data reproducing command is received from a user, the hard disk medium reproducing unit 30 mechanically moves the header 33, reads a corresponding A/V stream existing at a certain position of the platter and outputs it externally. Then, the renderer reproduces the A/V stream outputted from the hard disk medium reproducing unit 30 and the user can enjoy the content of the A/V stream.

Different content A/V streams as recorded in the storing medium of the hard disk medium reproducing unit 30 are recorded in different positions on the platter 31.

That is, as shown in FIG. 1, if two or more renderers request different A/V streams from the server, the header of the server reads two or more A/V streams while mechanically moving to the A/V stream-recorded positions in turn with certain time difference, and outputs them, causing a problem that transmission of A/V streams is slow.

In other words, in the case that one header makes a mechanical position movement to read two or more A/V streams, it takes long time to reproduce the audio/video streams beyond a range that a certain amount of audio/video streams are read and outputted within predetermined time.

Thereafter, as the A/V streams outputted from the server is delayed in its transmission, the renderer fails to output the certain amount of audio/video streams within predetermined time defined as a standard. Then, the A/V streams are disconnected midway, distorted or unrecognizable in form, changing from the content of the original A/V streams, resulting in a problem that an abnormal image is outputted.

In order to solve the problem, the conventional adds a memory in the renderer in order to receive the A/V streams for about 3 seconds to 5 seconds, to thereby output a normal image.

Namely, when a situation occurs that A/V streams are temporarily restrained from being reproduced due to a transmission delay, the already received A/V streams are supplied to a decoder without disconnection through the memory for a few seconds, so that a normal content with the original audio/video streams can be outputted on the screen.

However, the solution for the problem by adding the memory to the renderer causes an additional fabrication cost. In addition, if A/V stream transmission is continuously delayed because of simultaneous connection by plural renderers, the audio/video streams would not remain, resulting in a problem that a disconnection phenomenon or a distortion phenomenon occurs on the screen.

SUMMARY OF THE INVENTION

Therefore, an object of the present invention is to provide a method for preventing disconnection of audio/video streams in a home network that is capable of preventing generation of an abnormal image according to a service delay by transmitting A/V streams to a plurality of renderers through a software operation judging a reproduction processing capability of a server so that a service user can be provided with an image without disconnection.

To achieve these and other advantages and in accordance with the purpose of the present invention, as embodied and broadly described herein, there is provided a method for preventing disconnection of an audio/video stream in a home network, including: a step in which a renderer connected to a server requests A/V streams; a step in which the server judges whether A/V streams can be outputted in response to the request from the renderer; and a step in which the server provides the A/V streams to the renderer sequentially or simultaneously if the A/V stream can be outputted, or outputting a server unavailableness message to the renderer if the server judges that the A/V streams can not be outputted.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart of a method for preventing disconnection of audio/video streams in a home network in accordance with the present invention.

DETAILED DESCRIPTION OF THE PREFERRED EMBODIMENTS

Figure 1:
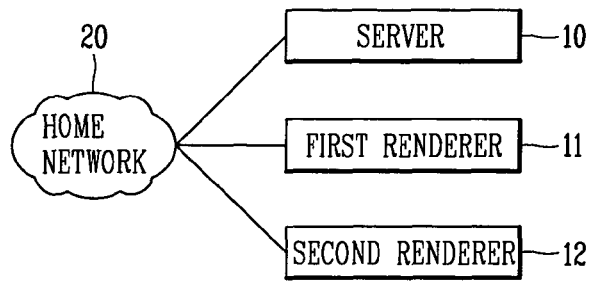
FIG. 1 illustrates connection between the server and plural renderers by home network.
Figure 2:
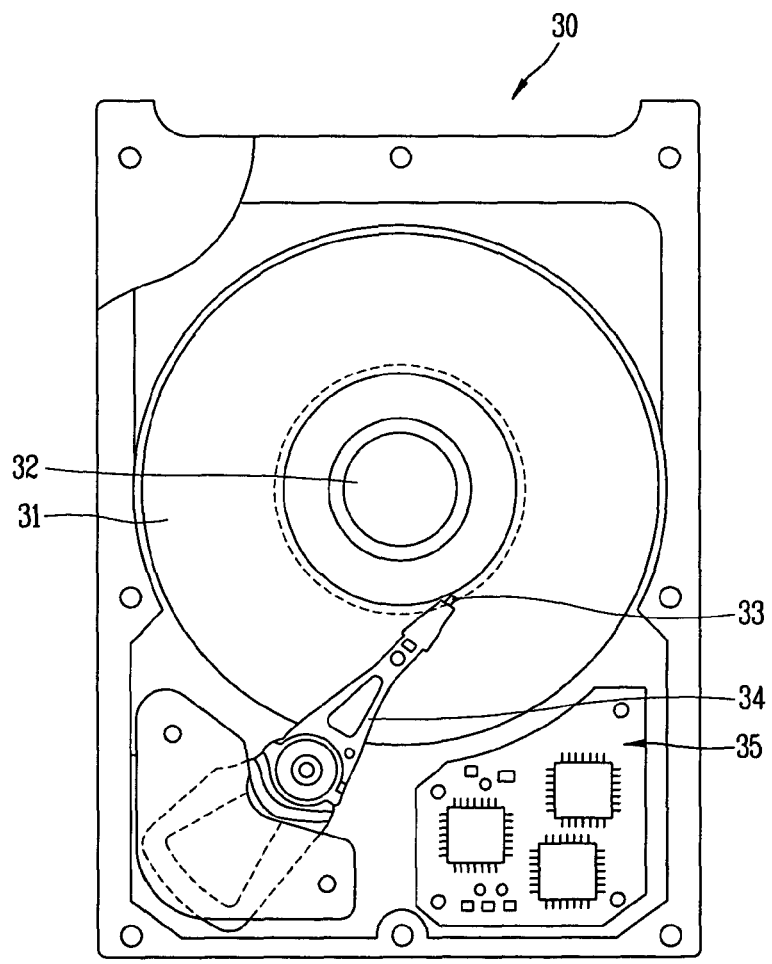
FIG. 2 illustrates a hard disk medium reproducing unit as a server for reproducing A/V streams.

Reference will now be made in detail to the preferred embodiments of the present invention, examples of which are illustrated in the accompanying drawings.

A preferred embodiment of a method for preventing disconnection of audio/video streams to provide A/V streams on a screen without disconnection in a situation that there are a server providing A/V streams and renderers connected to the server by a home network.

The server can be, for example, various medium reproducing units that may can reproduce an optical recording medium, a hard disk medium or a medium including the both medium. The various medium reproducing unit read A/V streams stored at certain positions of the storing medium through a header.

The plural renderers can be, for example, various display units for outputting the audio/video streams outputted from the server on a screen.

Meanwhile, the home network can be a cable communication network on the basis of ethernet or home PNA, IEEE1394, or a wireless communication network on the basis of a bluetooth, Wireless1394, HomeRF.

The operation method of the present invention will now be described.

First, the server judges whether A/V streams can be outputted by comparing transmission time of entire A/V streams during which the header of the server can read A/V streams simultaneously and output them, and predetermined transmission time according to a reproduction capability of the server required for reproducing A/V streams.

For example, when the hard disk medium reproducing unit operates as the server, the transmission time signifies total amount of time obtained by adding the a seek time taken for the header to move to an address where the A/V stream is positioned, a head activation time taken for the header to select a track in which the A/V stream is stored, a rotation latency time taken for the header to be positioned at a desired sector, and a time taken for the A/V stream read through the header to be transferred to the memory.

Therefore, unlike the conventional method in which only the fact that the server is in use or reproducing is detected, outputting of the A/V streams is cut off and the server unavailableness message is informed, in the present invention, only when the transmission time of the server is slower than the defined transmission time, the server unavailableness message is provided to the renderer, thereby guaranteeing smooth outputting of the currently reproduced A/V streams. Accordingly, in the present invention, plural renderers can be simultaneously operated.

For example, if the plural renderers simultaneously request an A/V stream and the A/V stream existing at the same reproduction position of the server is reproduced, so long as the transmission time needed by the server is guaranteed, the server can output the A/V stream simultaneously to the plural renderers.

Likewise, even though plural renderers do not request reproduction of an A/V stream existing at the same position, if it's within time for the header to reproduce audio/video streams of plural positions, plural A/V streams can be reproduced.

FIG. 3 is a flow chart of a method for preventing disconnection of audio/video streams in a home network in accordance with the present invention.

As shown in FIG. 3, the method for preventing disconnection of audio/video streams in a home network includes: a step (S100) in which plural renders connected to a server request A/V streams; a step (S110) in which the server judges whether A/V streams can be outputted in response to the request from the renderers; and steps (S120 and S130) in which if the server judges that A/V streams can be outputted, the server provides audio/video streams sequentially or simultaneously to the renderers, while if the server judges that audio/video streams can not be outputted, the server outputs a server unavailableness message to the renderers.

Herein, if some plural renders are additionally connected to the server and request A/V streams, the A/V streams are transferred from the server to the renderers in order of the plural renderers' stream transmission request. From a time point when server judges transmission of audio/video streams is not possible, the server outputs the server unavailableness message to a renderer which has requested the A/V streams.

A method where the server judges that A/V streams can be outputted to renderers in accordance with another embodiment of the present invention will now be described.

First, when renderers request plural A/V streams, if A/V streams are distanced in the storing medium, the movement distance of the header for reproducing the A/V streams is lengthened, so that A/V stream reading rate is much low. Then, the server compares the overall transfer rate of the A/V streams being reproduced and a predetermined A/V stream transfer rate on the basis of the distance between a position where the A/V stream requested by the renderer has been recorded and a position where the A/V stream being reproduced has been recorded.

And then, the server judges a time point where the overall transfer rate for the current reproduction becomes slower than the predetermined transfer rate, and transfers the server unavailableness message sequentially or simultaneously to connected renderers.

Second, the reproduction processing capability of the server including a CPU and the memory is judged to determine whether to output the server unavailableness message.

For example, if the server is designed to have a capability of transmission of only one audio/video stream, even though the header has such a rate and capability of reproducing plural A/V streams, only one A/V stream is finally outputted on a screen through the renderer.

Likewise, if two audio/video streams are being reproduced through a server which has been designed to have a capability of reproducing and processing two A/V streams, the server transfers the server unavailableness message to the renderer which has been connected additionally later to request transmission of A/V streams.

Third, the number of A/V streams that can be finally outputted is judged on the basis of the lowest reference of the header movement speed, header reading speed and the server's reproduction processing capability, in order to determine whether to transfer the server unavailableness message.

For example, if the header of the server has a capability of reading two A/V streams while the server has a capability of outputting three A/V streams, two A/V streams are finally outputted on the screen through the renderer.

Namely, if the server has a capability of reproducing and processing two A/V streams and it already reads and outputs two A/V streams, it transfers a server unavailableness message to a render which is additionally connected and requests transmission of an A/V stream.

As so far described, the method for preventing disconnection of audio/video streams of the present invention has the following advantage.

That is, A/V streams are transferred to plural renderers through a software operation for judging the reproduction processing capability. Therefore, even without a memory, an abnormal image is prevented from being outputted, so that a service user can be provided with an image without disconnection.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for outputting A/V streams onto a screen in response to a user's request by a home network which includes a server for outputting audio/video streams and plural renderers connected to the server through a home network, comprising:

a step in which a renderer connected to a server requests A/V streams;

a step in which the server judges whether A/V streams can be outputted in response to the request from the renderer; and a step in which the server provides the A/V streams to the renderer sequentially or simultaneously if the A/V stream can be outputted, or outputting a server unavailableness message to the renderer if the server judges that the A/V streams cannot be outputted, wherein, in the step of judging whether A/V streams can be outputted, the server compares transmission time of entire A/V streams and A/V stream transmission time according to a defined reproduction capability of the server required for reproducing A/V streams, and then judges whether the A/V streams can be outputted, and wherein the A/V stream transmission time signifies total amount of time obtained by adding the a seek time taken for a header to move to an address where the A/V stream is positioned, a head activation time taken for the header to select a track in which the A/V stream is stored, a rotation latency time taken for the header to be positioned at a desired sector, and a time taken for the A/V stream read through the header to be transferred to the memory.

2. A method for outputting A/V streams onto a screen in response to a user's request by a home network which includes a server for outputting audio/video streams and plural renderers connected to the server through a home network, comprising:

a step in which a renderer connected to a server requests A/V streams;

a step in which the server judges whether A/V streams can be outputted in response to the request from the renderer; and a step in which the server provides the A/V streams to the renderer sequentially or simultaneously if the A/V stream can be outputted, or outputting a server unavailableness message to the renderer if the server judges that the A/V streams cannot be outputted, wherein, in the step of judging whether A/V streams can be outputted, the server compares the overall transfer rate of the A/V streams being reproduced and a predetermined A/V stream transfer rate on the basis of the distance between a position where the A/V stream requested by the renderer has been recorded and a position where the A/V stream being reproduced has been recorded.

3. The method of claim 2, wherein the server judges a time point where the overall transfer rate for the current reproduction becomes slower than the predetermined transfer rate, and transfers the server unavailableness message sequentially or simultaneously to connected renderers.

4. A method for outputting A/V streams onto a screen in response to a user's request by a home network which includes a server for outputting audio/video streams and plural renderers connected to the server through a home network, comprising:

a step in which a renderer connected to a server requests A/V streams;

a step in which the server judges whether A/V streams can be outputted in response to the request from the renderer; and a step in which the server provides the A/V streams to the renderer sequentially or simultaneously if the A/V stream can be outputted, or outputting a server unavailableness message to the renderer if the server judges that the A/V streams cannot be outputted, wherein, in the step of judging whether A/V streams can be outputted, the server compares transmission time of entire A/V streams and A/V stream transmission time according to a defined reproduction capability of the server required for reproducing A/V streams, and then judges whether the A/V streams can be outputted, and wherein, in the step of judging whether A/V streams can be outputted, the number of A/V streams that can be finally outputted is judged on the basis of the lowest reference of header movement speed, header reading speed and the server's reproduction processing capability, in order to determine whether to transfer the server unavailableness message.

* * * * *